United States Patent [19]

Nakamura et al.

[11] Patent Number: 4,730,519

[45] Date of Patent: Mar. 15, 1988

[54] METHOD FOR CONTROLLING AN AUTOMATIC TRANSMISSION INCLUDING PREDETERMINED TIME DELAY IN SHIFTING

[75] Inventors: Yasunari Nakamura, Nagoya; Yoshio Shindo, Toyota, both of Japan

[73] Assignee: Toyota Jidosha Kabushiki Kaisha, Toyota, Japan

[21] Appl. No.: 71

[22] Filed: Jan. 2, 1987

[30] Foreign Application Priority Data

Jan. 13, 1986 [JP] Japan .................................. 61-4751

[51] Int. Cl.$^4$ ............................................ B60K 41/18
[52] U.S. Cl. .................................... 74/866; 364/424.1
[58] Field of Search ..................... 74/866, 732, 733; 364/424.1

[56] References Cited

U.S. PATENT DOCUMENTS

| | | | |
|---|---|---|---|
| 3,750,495 | 8/1973 | Ito et al. .................................. | 74/866 |
| 4,228,700 | 10/1980 | Espenschied et al. ................. | 74/866 |
| 4,338,666 | 7/1982 | Suzuki et al. ...................... | 364/424.1 |
| 4,367,528 | 1/1983 | Kawamoto et al. ............. | 364/424.1 |
| 4,495,576 | 1/1985 | Ito .................................. | 364/424.1 |
| 4,514,811 | 4/1985 | Daubenmier et al. ........... | 364/424.1 |
| 4,582,182 | 4/1986 | Takeda et al. ...................... | 74/732 |
| 4,611,285 | 9/1986 | Weisman, II ..................... | 364/424.1 |

FOREIGN PATENT DOCUMENTS

32063 7/1985 Japan .

Primary Examiner—Dirk Wright
Attorney, Agent, or Firm—Oblon, Fisher, Spivak, McClelland & Maier

[57] ABSTRACT

The automatic transmission has clutches and brakes to change the gear ratio. The clutches and brakes are independently actuated by hydraulic servos. A hydraulic circuit supplies oil to and from the servos to either actuate or release them. Within the hydraulic circuit are solenoids which respond to an electronic control. The electronic control regulates the pressure in the hydraulic servos by supplying signals to the solenoids. By providing a predetermined time delay in the sending of a signal to the on-coming servo during a gear shift, a smoother shift can be achieved. The shift is further improved by varying the time delay by a predetermined value based on the previous condition of the off-going servo.

10 Claims, 14 Drawing Figures

| | GEAR RATIO | UPSHIFT | | | DOWNSHIFT | | |
|---|---|---|---|---|---|---|---|
| | | $T_1$ | $T_2$ | $T_3$ | $T_1$ | $T_2$ | $T_3$ |
| DIRECT COUPLING CLUTCH ON BEFORE GEAR RATIO CHANGE | 1st ↔ 2nd | — | — | $t_3$ | $t_4$ | O | — |
| | 2nd ↔ 3rd | $t_{11}$ | $t_{12}$ | $t_{13}$ | $t_{14}$ | O | $t_{16}$ |
| | 3rd ↔ O/D | $t_{21}$ | $t_{22}$ | $t_{23}$ | $t_{24}$ | O | $t_{26}$ |
| DIRECT COUPLING CLUTCH OFF BEFORE GEAR RATIO CHANGE | 1st ↔ 2nd | O | O | $t_3$ | O | O | — |
| | 2nd ↔ 3rd | O | O | $t_{13}$ | O | O | $t_{16}$ |
| | 3rd ↔ O/D | O | O | $t_{23}$ | O | O | $t_{26}$ |

| GEAR RATIO | FRICTIONAL ENGAGING ELEMENTS | | | | | | |
|---|---|---|---|---|---|---|---|
| | Co | Bo | C1 | C2 | B1 | B2 | B3 |
| 1st | ○ | × | ○ | △ | × | × | × |
| 2nd | ○ | × | ○ | × | × | ○ | × |
| 3rd | ○ | × | ○ | ○ | × | ○ | × |
| O/D | × | ○ | ○ | ○ | × | ○ | × |

○: SERVO MECHANISM, ENGAGED

△: SERVO MECHANISM, RELEASED AND IDLING

×: SERVO MECHANISM, RELEASED AND STOPPED

FIG. 10

METHOD FOR CONTROLLING AN AUTOMATIC TRANSMISSION INCLUDING PREDETERMINED TIME DELAY IN SHIFTING

BACKGROUND OF THE INVENTION

This invention relates to a method for controlling an automatic transmission. More particularly, it relates to a method for controlling an automatic transmission wherein hydraulic servo mechanisms are controlled by means of an electronic control device, thereby controlling change of gear ratio, engagement or release of a direct coupling clutch, and the like.

Automatic transmissions loaded on automobiles are generally of the type wherein a speed change gear mechanism predominantly comprising a plurality of planetary gear mechanisms and a plurality of frictional engaging elements such as wet multi-plate clutches and brakes is coupled to the engine through a hydraulic torque converter. To compensate for a loss of power transmission in the torque converter, it is recently a common practice to arrange in parallel with the torque converter a direct coupling clutch adapted to be engaged only during driving operation above a predetermined speed. These operations of changing the gear ratio of the speed change gear mechanism and engaging or releasing the direct coupling clutch are conducted by hydraulic servo mechanisms. Two methods are known for this purpose. One method utilizes a hydraulic pressure based on the number of revolutions of an output shaft of the speed change gear mechanism and another hydraulic pressure given by a throttle valve operating in proportion to a throttle opening. The other method uses a microcomputer-based electronic control device to control solenoid valves on the basis of a throttle opening and output shaft revolutions. The latter is superior in accomplishing high precision multi-mode control.

Figure 7:
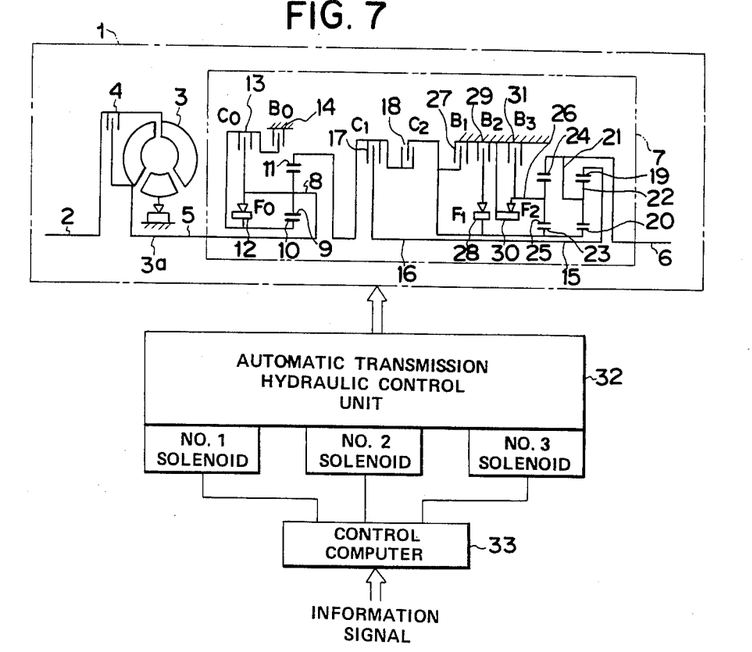
FIG. 7 schematically illustrates one example of an automatic transmission with a control unit which the present method is applicable.

Referring to FIG. 7, there is schematically illustrated a computer controlled automatic transmission having a direct coupling clutch. The illustrated automatic transmission is the one described in Japanese Patent Publication No. 60-32063 by the same assignee as the present invention. The automatic transmission generally designated at 1 comprises a torque converter 3 having an input shaft 2 which is coupled to the output shaft of an engine (not shown) and an output shaft 3a, a direct coupling clutch 4 disposed in parallel with the torque converter 3 for directly coupling the input shaft 2 to the torque converter output shaft 3a, and a speed change gear mechanism 7 essentially including three sets of planetary gear mechanisms and frictional engaging elements arranged between an input shaft 5 coupled to the torque converter output shaft 3a and an output shaft 6. The input shaft 5 is connected to a carrier 8 of a first planetary gear mechanism. Supported by the carrier 8 is a pinion 9 which is in mesh with a sun gear 10 and a ring gear 11. Among them, the sun gear 10 is connected so as to be integrally coupled with the carrier 8 by a F0 one-way clutch 12, and provided with a B0 brake 14 for securing the sun gear 10 to the housing. This arrangement constitutes an overdrive mechanism for setting a gear ratio of up to unity (1). The ring gear 11 on the output side is connected to an intermediate shaft 15 and a sun gear shaft 16 through a C1 clutch 17 and a C2 clutch 18, respectively. Connected to the intermediate shaft 15 is a ring gear 19 of a third planetary gear mechanism which further includes a sun gear 20 attached to the sun gear shaft 16 and a carrier 21 which supports a pinion 22 in mesh with the ring and sun gears 19 and 20. A second planetary gear mechanism includes a sun gear 23 which is also attached to the sun gear shaft 16 and a ring gear 24 which is integrally connected to the output shaft 6 along with the carrier 21 of the third planetary gear mechanism. A pinion 25 in mesh with the sun and ring gears 23 and 24 is supported by a carrier 26. The sun gear shaft 16 having the sun gear 23 mounted thereon is adapted to be selectively secured to the housing by either a B1 brake 27 or a B2 brake 29 connected via a F1 one-way clutch 28. The carrier 26 is adapted to be connected to the housing through a F2 one-way clutch 30 and to be selectively secured to the housing through a B3 brake 31.

Figure 8:
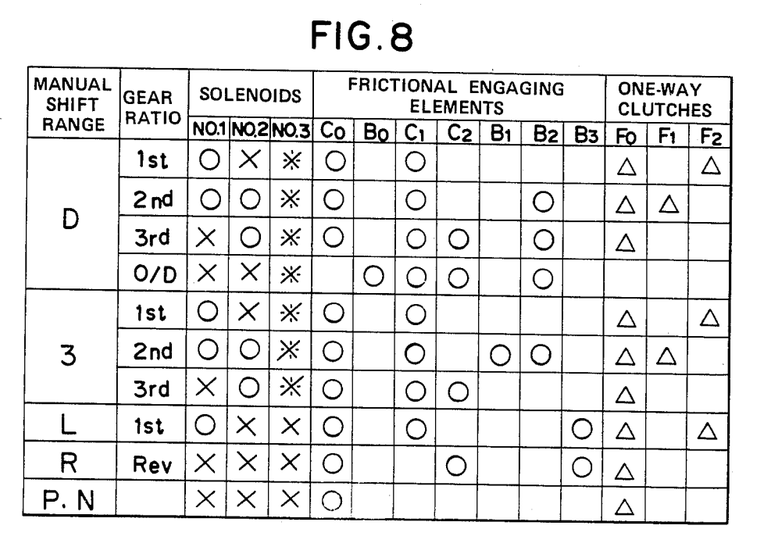
FIG. 8 is a table showing whether solenoids, frictional engaging elements, and one-way clutches are energized or de-energized, or engaged at various gear ratios in the speed change gear mechanism shown in FIG. 7.

The above-illustrated automatic transmission 1 is of the type wherein the frictional engaging elements, clutches and brakes are engaged or released by hydraulic servo mechanisms to conduct a change of gear ratios including four forward gear ratios (including the overdrive ratio) and one reverse gear ratio. An automatic transmission hydraulic control unit 32 for performing control operation for such a purpose has three solenoids Nos. 1 to 3 which are controlledly turned on and off by a control computer 33. Nos. 1 and 2 solenoids serve to control the speed change gear mechanism 7 to change the gear ratios among the four forward gear ratios and one reverse gear ratio whereas No. 3 solenoid serves to control engagement or release of the direct coupling clutch 4. Based on a number of information signals representative of vehicle driving conditions including vehicle speed, throttle opening, manual shift range, gear ratio, engine temperature, and the like, the control computer 33 computes driving parameters ensuring an optimum vehicle driving condition, and accordingly performs ON-OFF control on the respective solenoids to effect gear ratio change and engagement or release of the direct coupling clutch 4. The way of setting a certain gear ratio by the selective engagement or release of the respective frictional engaging elements is described in the above-cited patent publication. The gear ratio setting procedure is tabulated in FIG. 8. In the table, D, 3, L, R, P, and N under the heading "Manual Shift Range" represent drive range, top gear range, low gear range, reverse range, parking, and neutral; and 1st, 2nd, 3rd, O/D, and Rev under the heading "Gear Ratio" represent first speed, second speed, third speed, overdrive, and reverse gear ratios, respectively. Under the heading "Solenoids", a circle "O" means that the relevant solenoid is energized, a cross "X" means that the relevant solenoid is de-energized, and an asterisk "*" means that the relevant solenoid is energized when the direct coupling clutch is to be engaged. Under the heading "Frictional Engaging Elements", a circle "O" means that the relevant element is engaged while released elements are shown blank. Under the heading "One-Way Clutches", a triangle "Δ" means that the relevant clutch is engaged only during engine driving while released clutches are shown blank.

Changing to a certain gear ratio is carried out using a signal produced by the control computer 33 according to a shift schedule given by the throttle opening and the number of revolutions of the output shaft 6 as parameters. Similarly, engagement or release of the direct coupling clutch 4 is controlled using a signal produced by the control computer 33 according to a schedule given by the throttle opening and the number of revolutions of the output shaft 6 as parameters.

Now it is assumed that the accelerator pedal is worked down to increase the throttle opening. As the output shaft then gradually increases its number of revolutions, the gear ratio is progressively shifted up from the 1st ratio and the direct coupling clutch is engaged. On the contrary, the gear ratio is shifted down when the throttle opening is narrowed to reduce the output shaft revolution. If such a change of gear ratio takes place with the direct coupling clutch engaged, the changing process does not proceed smoothly, giving rise to a so-called gear change shock. A prior art common solution is to temporarily release the direct coupling clutch during gear ratio changing.

Japanese Patent Publication No. 60-32063 previously cited is directed to a control method capable of optimizing the timing of temporary release of the direct coupling clutch during the up- or down-shifting operation. Briefly stated, the method involves the steps of presetting a variety of times depending on the gear ratio changing schedules, selecting a suitable one among the preset times according to a particular gear ratio changing schedule based on changes of throttle opening and output shaft revolution, and releasing (OFF) or engaging (ON) the direct coupling clutch at a point preceding or following the time of delivery of a shift change signal by the selected time.

Change of gear ratio is carried out by changing the engagement or release of frictional engaging elements of the aforementioned speed change gear mechanism 7 by means of hydraulic servo mechanisms, and engagement or release of the direct coupling clutch carried out in a similar manner. The transient engaging or releasing properties of each element are largely affected by the temperature and viscosity of the oil used and the discharge of oil from the hydraulic servo mechanisms. For these reasons, the above-mentioned method optimizes the on-off timing of the direct coupling clutch in changing of gear ratio by presetting a variety of times.

Figure 9:
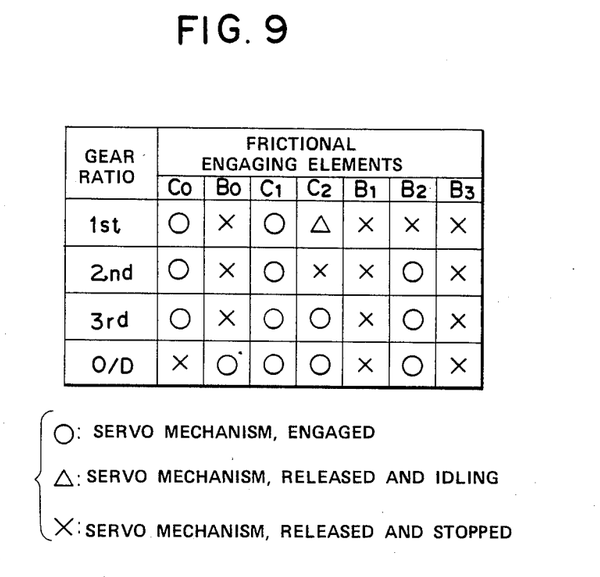
FIG. 9 is a table showing whether the frictional engaging elements are engaged or released at various gear ratios.
Figure 10:
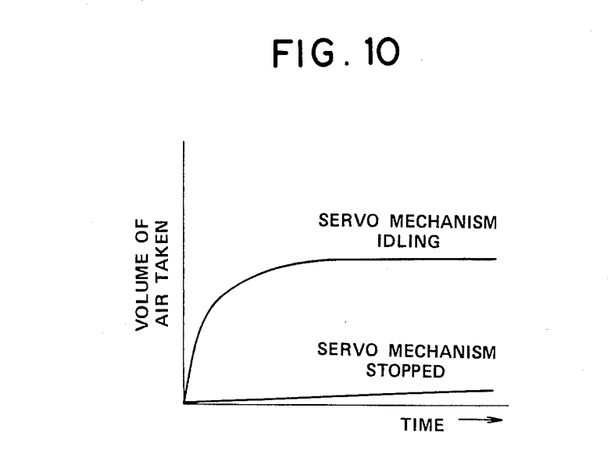
FIG. 10 is a graph showing the volume of air taken in the hydraulic servo mechanism associated with clutch C2 as a function of time.

However, in the automatic transmission 1 having the speed change gear mechanism of the type shown in FIG. 7, the state of oil in some hydraulic servo mechanisms can change with the preceding state or with time, and the stage that the relevant hydraulic servo mechanism has experienced influences the transition upon the subsequent engagement or release. FIG. 9 tabulates the operations of frictional engaging elements in the speed change gear mechanism 7 for each of the gear ratios. It is understood that clutch C2 idles in released state in the 1st range, stops in released state in the 2nd range, but is engaged in the remaining ranges. Accordingly, the volume of air taken in the hydraulic servo mechanism associated with clutch C2 (that is, the volume of oil left therein) greatly varies between these states as shown in FIG. 10. More particularly, when clutch C2 is idling in released state, the hydraulic servo mechanism associated with clutch C2 is mostly emptied of the oil. On the contrary, when clutch C2 is stopped in released state, the hydraulic servo mechanism associated therewith has a larger volume of oil left therein, with the difference in oil volume increasing with the lapse of time. Consequently, clutch C2 requires a longer time to complete its engagement when being engaged after idling than when being engaged otherwise. Differently stated, there is recognized a difference in transient properties or time required in speed change between the speed change in the order of 1st to 2nd to 3rd and the speed change in the order of 3rd to 2nd to 3rd.

Since the aforementioned prior art method, however, adjusts the timing of actuating frictional engaging elements using a predetermined fixed time, the timing adjustment does not reflect the antecedent, that is, state preceding the state from which a change is to be made. The same set time is utilized for the speed change from 2nd to 3rd irrespective of whether it is the 1st→2nd→3rd or the 3rd→2nd→3rd speed change mentioned above. Thus there is the likelihood that release or engagement of the direct coupling clutch is too fast or too late in carrying out the 2nd to 3rd speed change.

Therefore, an object of the present invention is to provide a novel and improved method for controlling an automatic transmission which can optimize not only the timing of release and engagement of a direct coupling clutch during up- or down-shifting process, but also the timing of operating frictional engaging elements without increasing the number of parts involved.

SUMMARY OF THE INVENTION

The present invention is associated with an automatic transmission comprising a plurality of frictional engaging elements arranged in frictional engagement for changing the state of transmission of engine power, a plurality of hydraulic servo mechanisms cooperated with the corresponding frictional engaging elements for independently engaging or releasing the frictional engaging elements, and electronic control means for delivering control signals to the hydraulic servo mechanisms. According to the present invention, there is provided a method for controlling an automatic transmission of the above-mentioned organization, comprising the step of independently engaging or releasing selected ones of the frictional engaging elements to change the power transmission state, characterized in that the delivery of a signal from the electronic control means to the hydraulic servo mechanism to operate one selected frictional engaging element is delayed a predetermined time from the delivery of a signal from the electronic control means to the hydraulic servo mechanism to operate another selected frictional engaging element, and the predetermined delay time is varied depending on the antecedent state of the other frictional engaging element preceding its operation.

The automatic transmission which is controlled by the present method is one wherein frictional engaging elements such as clutches and brakes and a direct coupling clutch are operated by means of hydraulic servo mechanisms which are, in turn, controlled by an electronic control device. In changing the power transmission state by concurrently changing a plurality of frictional engaging element, for example, by conducting engagement or release of clutches or brakes in the speed change gear mechanism and at the same time, temporarily releasing the direct coupling clutch, the electronic control device first supplies an actuating signal to the hydraulic servo mechanism associated with a frictional engaging element to be operated. Next, after a predetermined delay time, the electronic control device first supplies an actuating signal to the hydraulic servo mechanism associated with another frictional engaging element to be operated. At this point, the delay time is adjusted in accordance with the antecedent state of these frictional engaging elements, more particularly, depending on whether they have been stopped in released state, idling in released state, or engaged. In one instance wherein the time required to actuate the hydraulic servo mechanism associated with one of two frictional engaging elements to be operated at the same time is longer due to its antecedent state, the delivery of a signal from the electronic control device to the hydraulic servo mechanism associated with the other frictional engaging element is delayed, that is, the delay time is increased. Conversely, when the hydraulic servo mechanism associated with one frictional engaging element to be operated acts more quickly due to its antecedent state, for example, a sufficient volume of oil left, the delivery of a signal from the electronic control device to the hydraulic servo mechanism associated with the other frictional engaging element is hastened, that is, the delay time is reduced. As a consequence, the operation timing (more exactly, operation completion timing) of frictional engaging elements cooperated to change the power transmission state becomes always constant independent of any change in transient properties of the hydraulic servo mechanisms, thus preventing such inconvenience as flaring-up of the engine and a sudden great change of output torque during gear ratio changing.

DETAILED DESCRIPTION OF THE PREFERRED EMBODIMENTS

One embodiment of the present invention will be described. The following description is made in conjunction with the temporary release during gear ratio changing of the direct coupling clutch of the automatic transmission 1 shown in FIG. 7. Therefore, the embodiment described hereinafter is an improvement of the method described in Japanese Patent Publication No. 60-32063 by the same assignee as the present invention, and the improvement is illustrated as being enclosed by dot-and-dash lines in the flow chart of FIGS. 1A to 1E.

FIG. 1 illustrates a flow chart of the present control method. Reference is first made to FIG. 1A, a first section of the chart. The automatic transmission 1 to which the present invention pertains uses the control compouter 33 to control the engagement (ON) and release (OFF) of frictional engaging elements including the direct coupling clutch as previously described. At the start, initial values are set, and then data are read in with respect to vehicle speed, throttle opening or boost pressure, manual shift valve changing position, and brake operation. The manual shift valve changing position is judged on the basis of the readin information. A gear change diagram or shift schedule is set when the set position is either of the D, 3 and L ranges. The direct coupling clutch is released and data are read in again when the set position is either of the P, R and N ranges. The shift schedule is a diagram that determines the relationships of throttle opening to output shaft revolution at which up- and down-shifting operations are carried out between 1st-2nd, 2nd-3rd, and 3rd-O/D. The diagram is described in the above-referred patent publication and other literature. The shift schedule is read in by inputting corresponding numerical values.

Figure 1A:
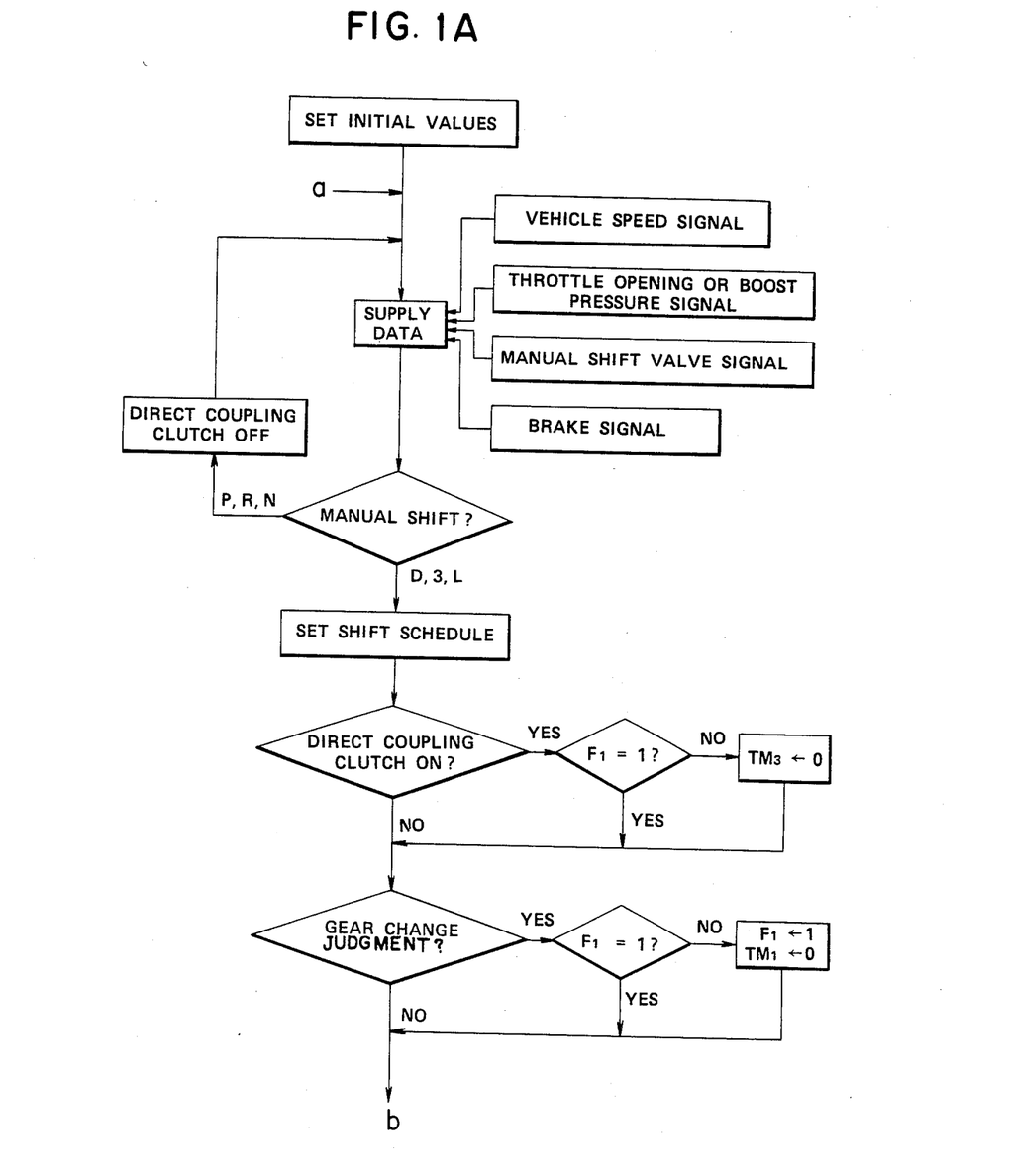
FIGS. 1A to 1E are successive sections of a flow chart illustrating one embodiment of the present control method.

After the shift schedule is set, it is judged whether or not the direct coupling clutch is engaged. During normal driving except gear ratio changes, the engagement and release of the direct coupling clutch is controlled on the basis of a situation determined by gear ratio, throttle opening, and output shaft revolution. This control procedure is represented by a diagram similar to the foregoing gear change diagram. Computer control is made according to the control pattern as is well known in the art. When the direct coupling clutch is engaged on account of the throttle opening and output shaft revolution in a predetermined range, it is then judged whether or not a flag F1 is "1". Since flag F1 is set to "0" during the setting of initial values, a first judgment will necessarily give a result of "NO" to reset a timer TM3 to "0". Therefore, when timer TM3 has a count equal to or approximating to zero, it means that the direct coupling clutch is engaged. On the contrary, when the count of timer TM3 is above a certain level, it means that the direct coupling clutch is released.

It is then determined whether or not a gear change judgment is present. This process is to judge whether or not the gear ratio of the speed change gear mechanism should be changed as a result of processing the input data. When the result of judgment is "YES", that is, to carry out gear ratio change, it is judged whether or not flag F1 is "1". Flag F1 is still "0" when the judgment is first made. The result of judgment is then "NO". At this point, flag F1 is set to "1" and a timer TM1 is reset to "0". Subsequently, the scanning process is recirculated to arrive at the steps "F1=1?" and "Direct Coupling ON?" again. If the results of judgment of these steps are "YES", neither timer TM3 nor TM1 is reset so that time counting is continued from the point of initial resetting.

Figure 1B:
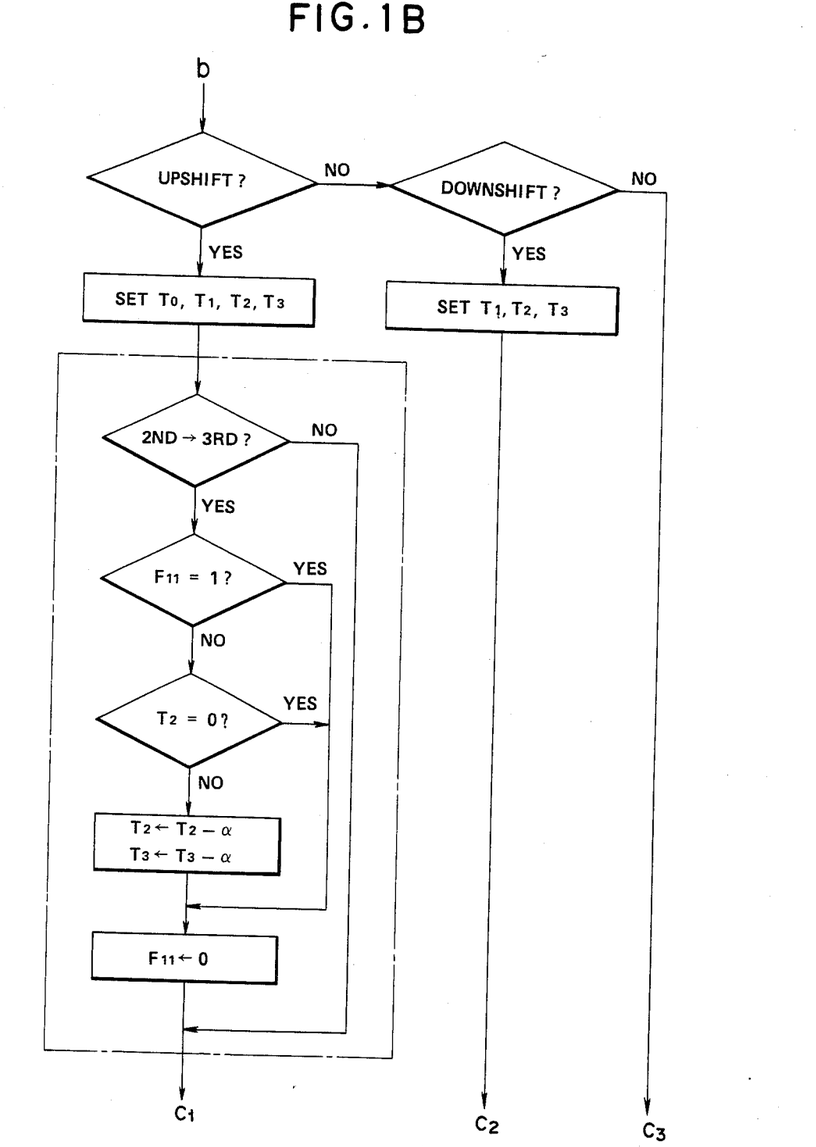
Figure 2:
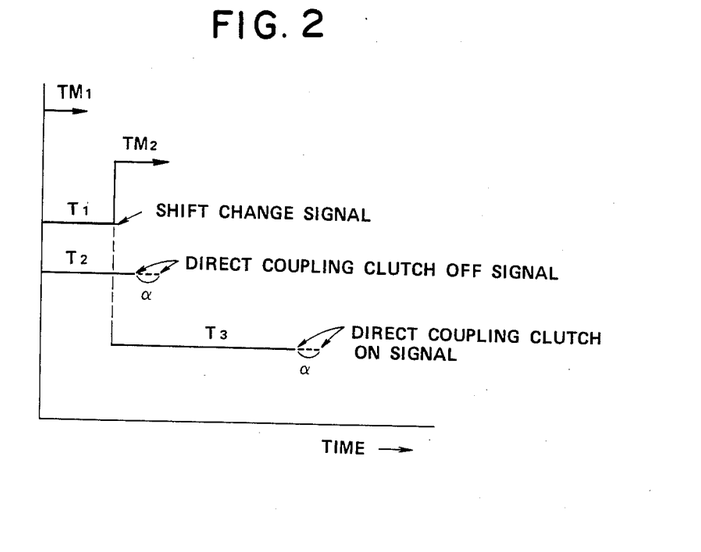
FIG. 2 is a diagram showing the relationship of times involved in the flow chart.
Figure 3:
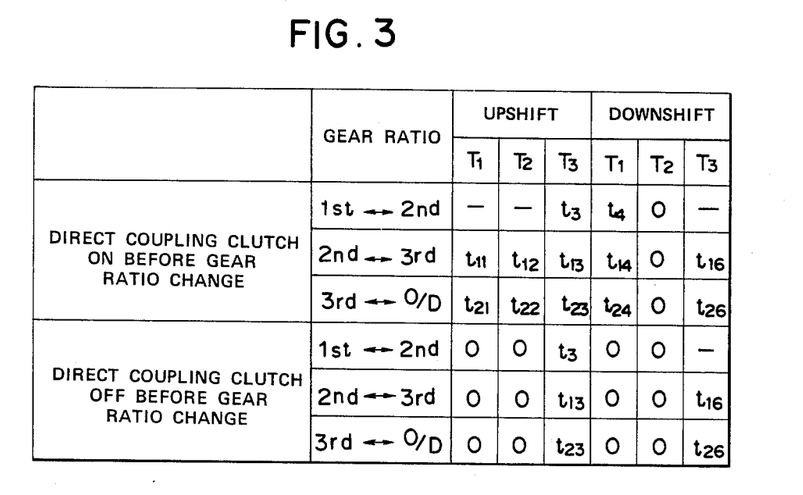
FIG. 3 is a table illustrating times set in various steps of the flow chart.

FIG. 1B is a section of the flow chart subsequent to that of FIG. 1A. Subsequent to "Gear Change Judgment?", it is judged whether or not the shift is upshift. If the upshift is commanded, setting of times T0, T1, T2, and T3 is made. Among them, T0 is a predetermined length of time set for judging whether or not the direct coupling clutch is engaged upon changing of gear ratio, whereas T1 to T3 are times related to the instant of gear change judgment, that is, the instant when timer TM1 is reset, as illustrated in FIG. 2. These times T1 to T3 may be previously set in the manner shown in FIG. 3, for example, and stored in a memory in the electronic control device. After these times are set, it is judged whether or not the upshift is that from the 2nd range to the 3rd range. This is because clutch C2 is changed from release to engagement during the 2nd to 3rd shift and may idle in a released state in the 1st range, so that the engagement transition, that is, 2nd to 3rd shift transition of clutch C2 is not always identical. If the shift is the 2nd to 3rd upshift, it is then judged whether or not a flag F11 is "1". This judgment step is taken to judge whether or not the current 2nd range is past the 1st range. Flag F11 is set "1" with the gear ratio in the 1st range as will be described later. If the result of judgment of "F11=1?" is "NO", that is, the 1st range is not antecedent immediately before, judgment of "T2=s0?" is first made in order to change T2 and T3 among the set times. If time T2 is not equal to zero, a correcting time $\alpha$ is subtracted from the previously set times T2 and T3 to give reset times T2 and T3. Differently stated, if the 1st range has not been passed just before, a relatively large volume of oil remains in the hydraulic servo mechanism associated with clutch C2 so that a change from 2nd to 3rd takes place quickly. For this reason, the set times are reduced. The correcting time $\alpha$ need not be necessarily a fixed value and it may be a variable determined using such factors as oil temperature and the holding time at the antecedent 1st range. Thus the correcting time $\alpha$ may be selected from a wide variety of values stored in the memory of the electronic control device or computed on the basis of the input information. After times T2 and T3 are adjusted as described above, flag F11 is set to "0", completing the adjustment of times T2 and T3 for the 2nd to 3rd upshift with the just preceding range being the 3rd. If the result of judgment of "2nd→3rd?" step is "NO", a skip is taken to the end of "F11←0" step without passing the adjustment of times T2 and T3. If the result of judgment of either "F11=1?" or "T2=0?" is "YES", a skip is taken to "F11→0" step without passing the adjustment of times T2 and T3.

Figure 1C:
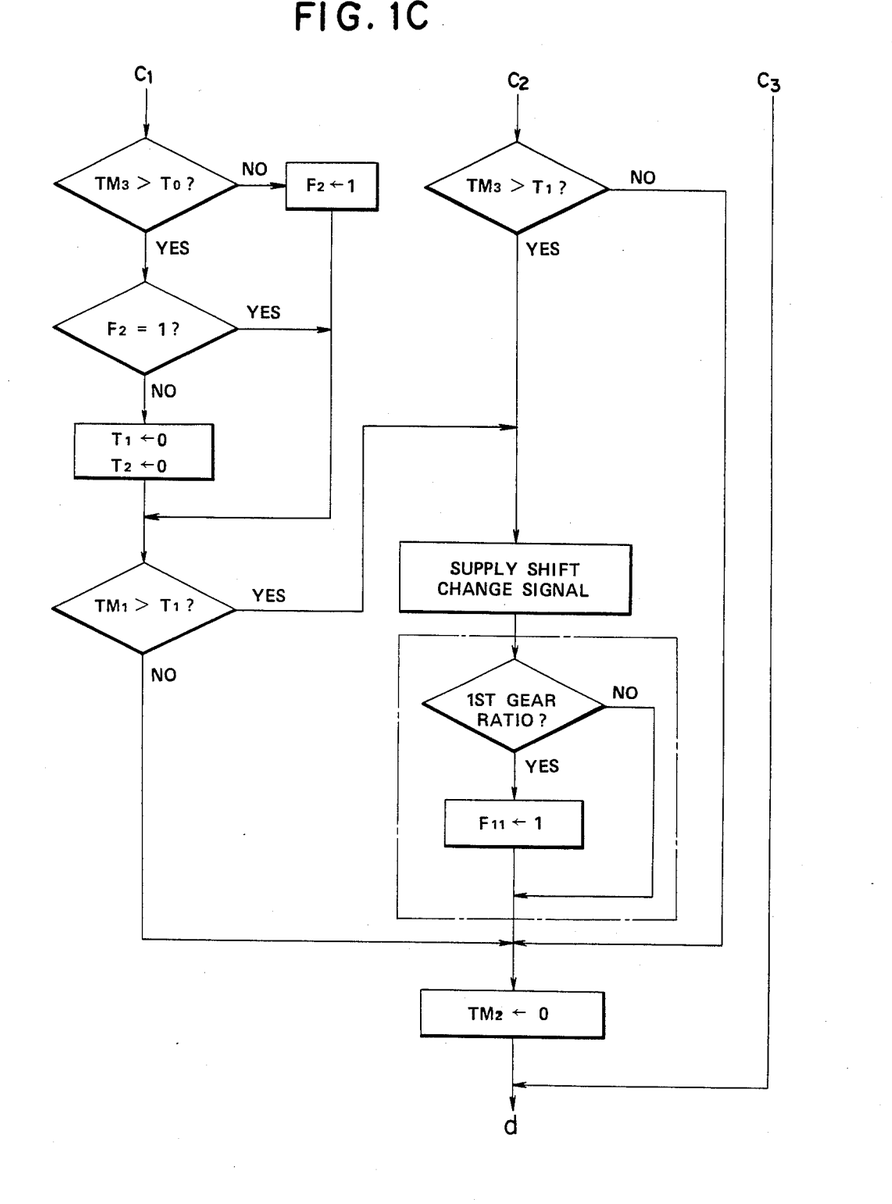

FIG. 1C is a section of the flow chart subsequent to that of FIG. 1B. After the time setting or adjustment of T2 and T3 is carried out as described above, it is judged whether or not the counted time of timer TM3 is longer than the preset time T0. If the timer TM3 count time is longer than the minute time T0, it means that timer TM3 has not zero reset within the minute time T0 and hence, that the direct coupling clutch has not been turned on over a substantial time prior to this point, that is, the direct coupling clutch is released. On the contrary, if the timer TM3 count time is shorter than T0, it means that the judgment of direct coupling on is made prior to the minute time T0 and hence, that the direct coupling clutch is in engagement. When it is judged that the direct coupling clutch is in engagement (that is, the result of judgment is "NO"),a flag F2 is then set to "1". When the timer TM3 count time is first judged as longer than T0 and flag F2 has not yet set to "1", then the result of judgment of the subsequent "F2=1?" step is "NO" because flag F2 is initially set to "0". Then, among the above-described times, T1 and T2 are set to "0" in this embodiment. This setting corresponds to the fact that T1 and T2 used in the upshift are set to "0" with respect to any changes between different gear ratios since the direct coupling clutch is released before the gear change.

The subsequent scanning step is to judge whether or not the counted time of timer TM1 is longer than the set time T1 described above. This judgment step is a step for delaying an actual point of time of gear change with respect to a point of time of judging gear change initiation. Thus time T1 is a time previously set to pass from the point of time of judging gear change initiation to a point of time of generating a shift change signal to actually carry out a gear ratio change. Time T1 is also a useful time during which it is judged prior to the gear ratio change whether the direct coupling clutch is on or off and timings T1, T2, and T3 suitable for the gear ratio change are set according to the result of judgment.

When it is judged that the counted time of timer TM1 is longer than T1, a shift change signal is delivered to carry out gear ratio change. At the end of gear ratio change, it is judged whether or not the resulting or new gear ratio is the 1st range. If the result of judgment is "YES", flag F11 is set to "1", with which the situation just before the 2nd to 3rd shifting is confirmed. If the result of jugment of "1st gear ratio?" is "NO", a skip is made to the end of "F11←1" step to enter a subsequent scanning step. If the counted time of timer TM1 has not reached T1, a skip is made to the subsequent scanning step without generating a shift change signal. The subsequent scanning step is to reset timer TM2 to "0". Thus, in either case, when a shift change signal is delivered as the counted time of timer TM1 exceeds T1, timer TM2 is reset so that timer TM2 starts counting time from this instant.

On the other hand, if the result of judgment of "upshift?" step previously described is "0", it is judged whether or not a downshift is commanded. When the downshift is commanded, times T1, T2, and T3 are set before it is judged whether or not the counted time of timer TM3 is longer than T1. If TM3 count time is longer than T1, a shift change signal is delivered to transfer to a subsequent scanning step. If TM3 count time has not reached T1, a skip is made to the step of resetting timer TM2 to "0" without generating a shift change signal. In this case, the direct coupling clutch is first released prior to changing of gear ratio in the speed change gear mechanism as will be understood from the following description.

Figure 1D:
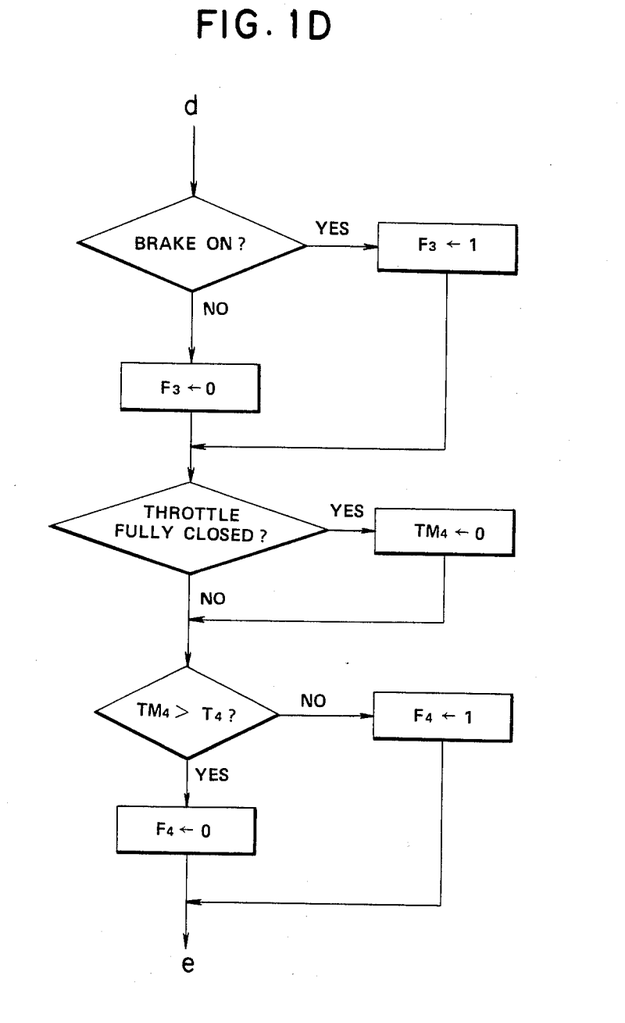

The "TM2←0" step is followed by the scanning steps shown in FIG. 1D. It is first judged whether or not the brake and throttle are suited for engagement of the direct coupling clutch. More specifically, it is judged whether or not the brake is stepped on. Flag F3 is set to "1" when the result is "YES" or reset to "0" when the result is "NO". This is to release the direct coupling clutch during application of the brake because engagement of the direct coupling clutch during application of the brake would cause engine stop.

It is then judged whether or not the accelerator pedal is released, that is, whether or not the throttle is fully closed. When the throttle is fully closed, a timer TM4 is reset so that it starts counting time from the instant of fully closing the throttle. When the throttle is not fully closed, timer TM4 has a counted time sufficiently longer than a predetermined time T4, and the result of judgment of "TM4>T4?" is then "YES" and a flag F4 is set to "0". Since the counted time of timer TM4 does not reach T4 for some time after the throttle is fully closed, flag F4 is set to "1" during that time. These operations are made such that at the instant when the throttle is fully closed, the direct coupling clutch is released for a predetermined time to allow the torque converter to effectively operate and the resulting buffer action mitigates a quick change of torque in the output shaft due to a quick change of engine torque resulting from the full closing of the throttle.

Figure 1E:
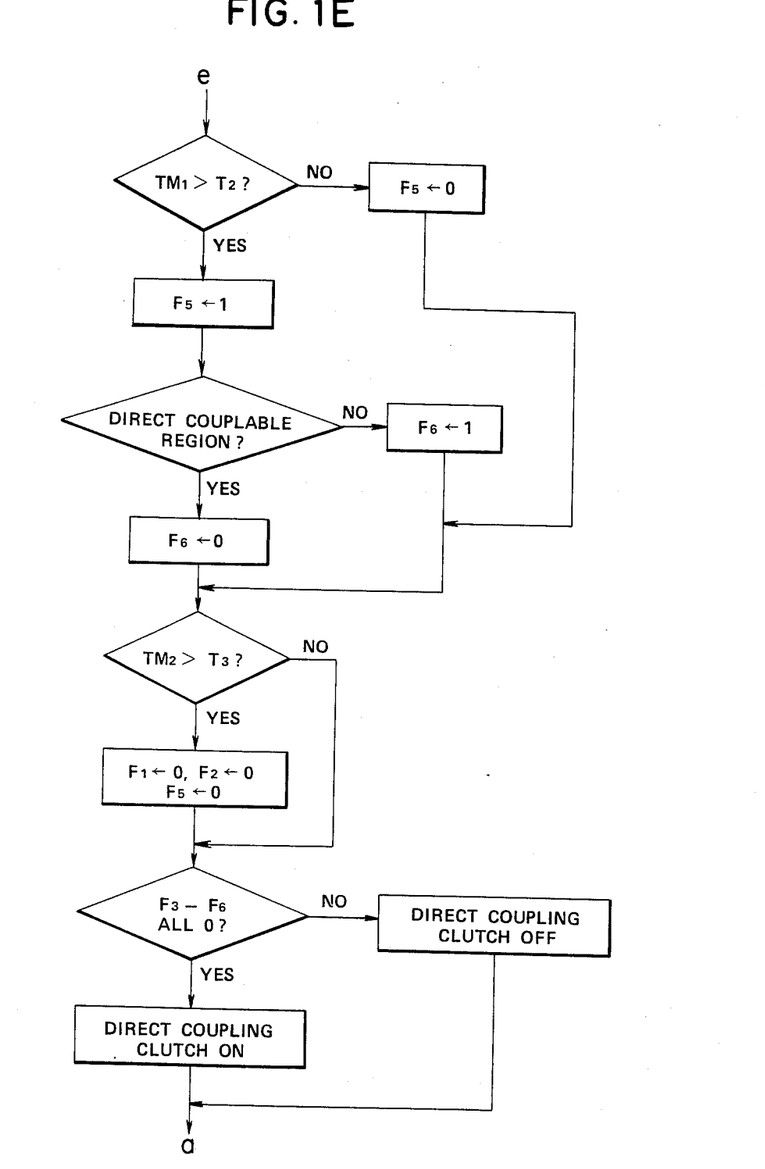

FIG. 1E is a section of the flow chart subsequent to that of FIG. 1D. It is judged whether or not the time measured from the instant of speed change judgment, that is, the instant of resetting timer TM1 exceeds T2. A flag F5 is set to "0" until the counted time of TM1 reaches T2, but to "1" when the counted time of TM1 exceeds T2. This is because it is better to keep the direct coupling clutch engaged until the predetermined time T2 has passed, even in the event of speed change judgment as shown in FIG. 2.

After the counted time of timer TM1 exceeds T2 and the direct coupling clutch is released, a time comes to engage the direct coupling clutch again. It is then judged whether or not the driving situation of the vehicle is within the region allowing engagement of the direct coupling clutch. A flag F6 is set to "0" if the result of judgment is indicative of possible engagement of the direct coupling clutch, but to "1" if the result is negative.

It is then judged whether or not the time counted from the instant of resetting timer TM2, that is, the instant of delivering a shift change signal exceeds T3. When the counted time of timer TM2 exceeds T3, flags F1, F2, and F5 are set to "0" and thereafter it is judged whether or not all flags F3 to F6 are "0". The direct coupling clutch is engaged if the result of judgment is "YES", but maintained released if the result is "NO". Until the counted time of timer TM2 reaches T3, the scanning process is repeated without setting flags F1, F3 and F3 to "0".

Figure 4:
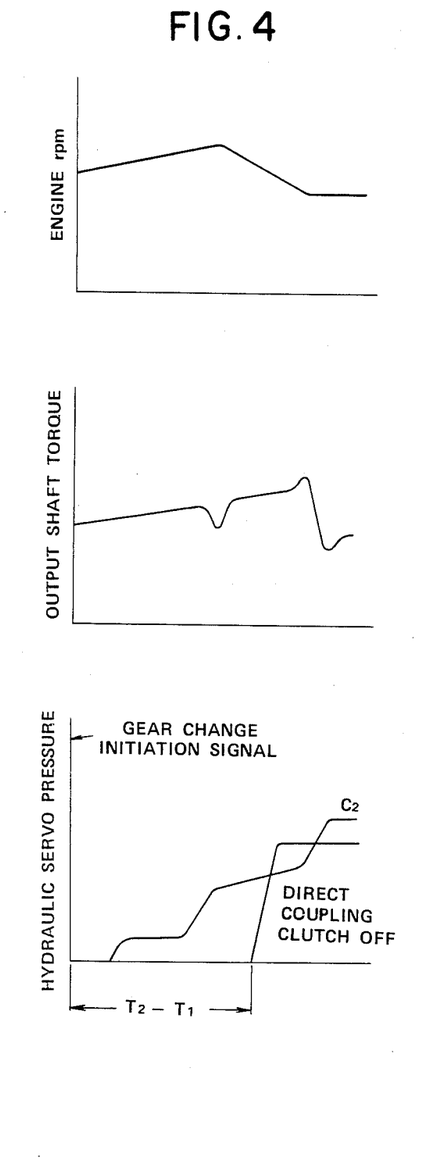
FIGS. 4 to 6 are diagrams graphically showing the change with time of engine revolution, output shaft torque, and hydraulic servo pressure during the speed change from 2nd to 3rd, FIG. 4 corresponding to an upshifting with the antecedent being the 1st range, and FIGS. 5 and 6 corresponding to an upshifting with the antecedent being the 3rd range, without and with the adjustment of set times using a correcting time, respectively.
Figure 5:
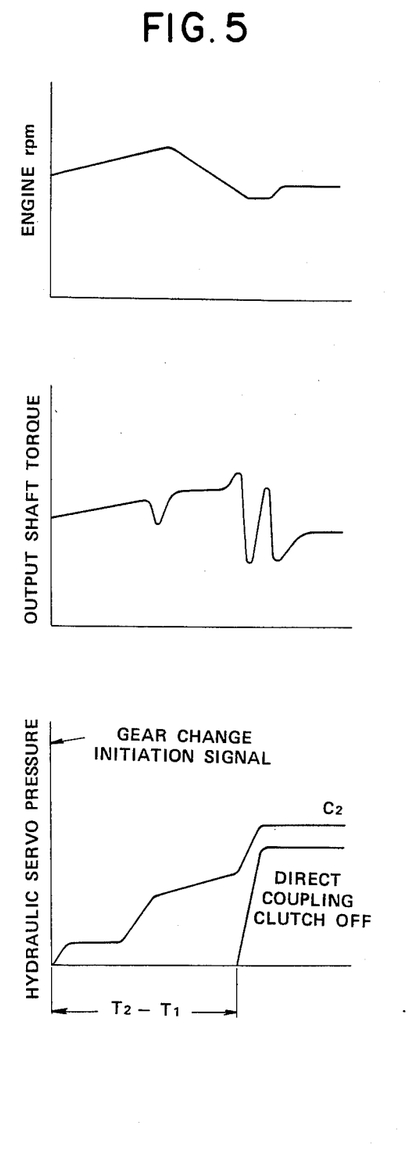
Figure 6:
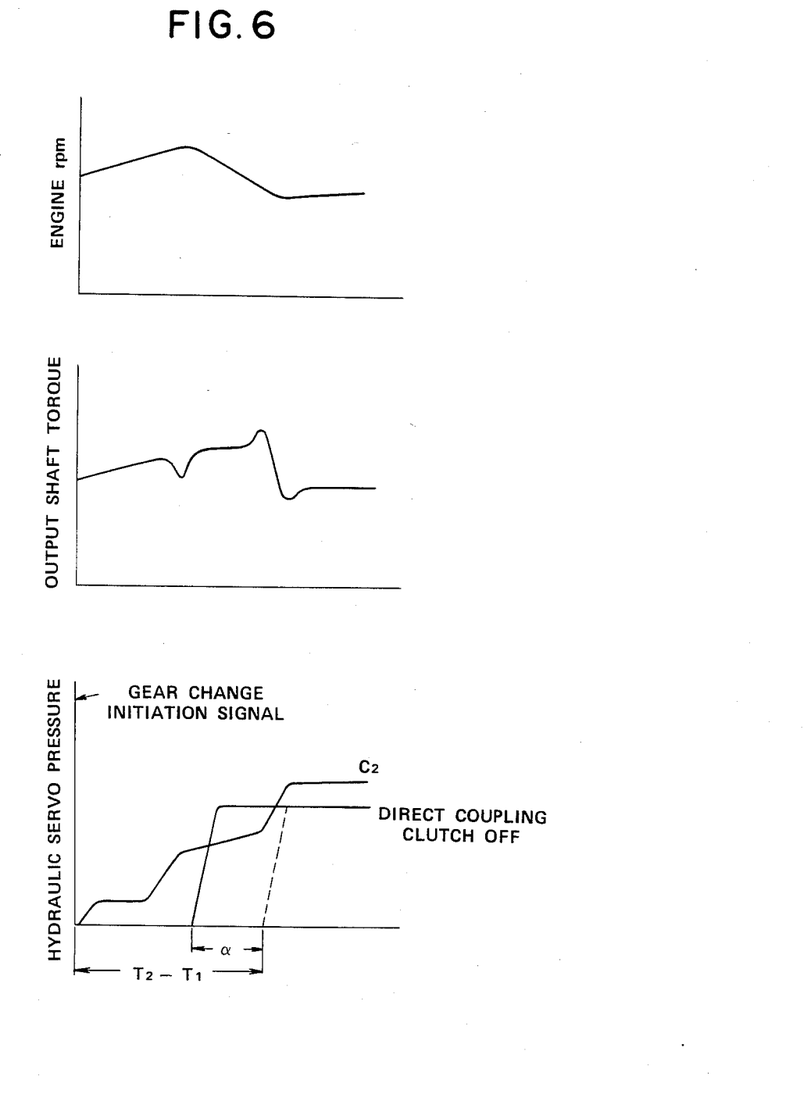

FIGS. 4 to 6 are diagrams graphically showing the change with time of engine revolution, output shaft torque, and hydraulic servo pressure during the speed change from 2nd to 3rd. FIG. 4 corresponds to an upshifting from the 2nd following the 1st range, and FIGS. 5 and 6 correspond to an upshifting from the 2nd following the 3rd range without and with the aforementioned adjustment of set times T2 and T3 using the correcting time α, respectively.

In the upshifting shown in FIG. 4, the antecedent gear ratio is the 1st range with clutch C2 released and idling, and the associated hydraulic servo mechanism has a reduced volume of oil left therein so that a certain time may pass from the delivery of a speed change initiation signal to the rising of a hydraulic servo pressure. With times T1, T2, and T3 set so as to match with the rising time, the direct coupling clutch is released an appropriate time before the completion of engagement of clutch C2, that is, completion of speed change.

In the upshifting shown in FIG. 5, the antecedent gear ratio is the 3rd range with clutch C2 engaged, and the associated hydraulic servo mechanism has a sufficient volume of oil charged therein so that the hydraulic pressure in the hydraulic servo mechanism associated with clutch C2 begins rising substantially at the same time as the delivery of a speed change initiation signal. Thus, the direct coupling clutch is released after the substantial completion of engagement of clutch C2, that is, substantial completion of speed change, giving rise to a sudden great change in the output shaft torque.

In the upshifting shown in FIG. 6, clutch C2 has not been released or idling, the set time T2 is adjusted by subtracting the correcting time α to reduce the set time. The direct coupling clutch is released earlier. As a result, the actual timing of speed change and the timing of releasing the direct coupling clutch are optimized, preventing a sudden change in the output shaft torque and flaring-up of the engine.

Since the above-mentioned embodiment deals with the automatic transmission of the type shown in FIG. 7, reference is made to the speed change from 2nd to 3rd because of the most outstanding benefit. The present invention is, however, not limited to the above-mentioned embodiment. Since the volume of oil in the hydraulic servo mechanism is generally dependent on the situation prevailing just before the stage from which a change is to be made, the present invention is generally applicable to the control of frictional engaging elements other than the direct coupling clutch and clutch C2 mentioned above. For instance, the present invention is applicable to an automatic transmission intended for part-time four wheel driving in controlling a clutch and the like in changing between two wheel drive and four wheel drive modes. Of course, the automatic transmission to which the present invention pertains is not limited to the one illustrated in FIG. 7.

In conjunction with an automatic transmission comprising a plurality of frictional engaging elements arranged in frictional engagement for changing the state of transmission of engine power, a plurality of hydraulic servo mechanisms cooperated with the corresponding frictional engaging elements for independently engaging or releasing the frictional engaging elements, and electronic control means for delivering control signals to the hydraulic servo mechanisms, the present control method involves the step of independently engaging or releasing selected ones of the frictional engaging elements to change the power transmission state, wherein the electronic control means supplies a signal to the hydraulic servo mechanism associated with one selected frictional engaging element to operate the element with a predetermined delay time from the time when the electronic control means supplies a signal to the hydraulic servo mechanism associated with another selected frictional engaging element to operate the element, and the delay time is varied depending on the antecedent state of the other frictional engaging element. Since the control operation which is made by the present invention reflects the current volume of oil in the hydraulic servo mechanism, such control operations as a change of gear ratio and engagement or release of the direct coupling clutch can be performed in a smooth and appropriate manner by adjusting the timing of delivery of a signal from the electronic control device, avoiding such inconvenience as apparatus size and weight increases.

We claim:

1. In a method for controlling an automatic transmission comprising
    a plurality of frictional engaging elements arranged in frictional engagement for changing the state of transmission of engine power,
    a plurality of hydraulic servo mechanisms cooperated with the corresponding frictional engaging elements for independently engaging or releasing the frictional engaging elements, and
    electronic control means for delivering control signals to the hydraulic servo mechanisms,
    said method comprising the step of independently engaging or releasing selected ones of said frictional engaging elements to change the power transmission state, the improvement wherein the delivery of a signal from the electronic control means to the hydraulic servo mechanism to operate one selected frictional engaging element is delayed a predetermined time from the delivery of a signal from the electronic control means to the hydraulic servo mechanism to operate another selected frictional engaging element, the other frictional engaging element taking a present state after having passed an antecedent state and being operated from the present to a subsequent state, and the predetermined delay time being varied depending on the antecedent state of the other frictional engaging element preceding its operation.

2. The method of claim 1 wherein the transmission comprises
   a torque converter including input and output shafts,
   a direct coupling clutch associated with the torque converter for directly coupling said input and output shafts, and
   speed change gear means including a plurality of clutches and brakes and planetary gear mechanisms.

3. The method of claim 2 wherein said transmission can provide a plurality of gear ratios including at least first, second and third gear ratios by bringing said clutches and brakes into or out of engagement in response to a signal delivered from said electronic control means.

4. The method of claim 3 wherein said direct coupling clutch is temporarily released when said speed change gear means changes its gear ratio.

5. The method of claim 4 wherein a signal is delivered by said electronic control means to release and engage the direct coupling clutch after a predetermined delay time has passed since the delivery of a signal from the electronic control means for the speed change gear means to perform gear ratio change.

6. The method of claim 5 wherein said delay time is shorter in the change of the speed change gear means from the second to the third gear ratio past the first gear ratio than in the change from the second to the third gear ratio past the third gear ratio.

7. The method of claim 1 wherein said delay time varies with a particular change of the power transmission state.

8. The method of claim 1 wherein said delay time is varied by subtracting or adding a correcting time from or to the predetermined time.

9. The method of cliam 8 wherein the correcting time has a predetermined constant value.

10. The method of claim 9 wherein the correcting time is computed from data introduced in said electronic control means.

* * * * *